United States Patent
Asai

(10) Patent No.: US 9,147,526 B2
(45) Date of Patent: Sep. 29, 2015

(54) PROTECTOR FOR ELECTROCHEMICAL ELEMENT

(71) Applicant: MEIDENSHA CORPORATION, Tokyo (JP)

(72) Inventor: Takahiro Asai, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 410 days.

(21) Appl. No.: 13/765,206

(22) Filed: Feb. 12, 2013

(65) Prior Publication Data

US 2013/0216882 A1 Aug. 22, 2013

Related U.S. Application Data

(62) Division of application No. 12/743,708, filed as application No. PCT/JP2008/070707 on Nov. 13, 2008, now abandoned.

(30) Foreign Application Priority Data

Nov. 22, 2007 (JP) ................. 2007-302493

(51) Int. Cl.
  *H01G 2/10* (2006.01)
  *H01M 2/10* (2006.01)
  *H01G 9/08* (2006.01)
  *H01G 9/00* (2006.01)

(52) U.S. Cl.
  CPC ............... *H01G 2/103* (2013.01); *H01G 9/08* (2013.01); *H01G 9/155* (2013.01); *H01M 2/1016* (2013.01); *H01M 2/1061* (2013.01); *H01M 2/1072* (2013.01); *Y02E 60/13* (2013.01); *Y10T 428/24479* (2015.01); *Y10T 428/24504* (2015.01)

(58) Field of Classification Search
  CPC ......... H01G 2/103; H01G 9/08; H01G 9/155; H01M 2/1016; H01M 2/1061; H01M 2/1072; Y10T 428/24479; Y10T 428/24504; Y02E 60/13
  See application file for complete search history.

(56) References Cited

U.S. PATENT DOCUMENTS 3,939,967 A 2/1976 Tenney et al.
4,233,371 A 11/1980 Dorrestijn
(Continued)

FOREIGN PATENT DOCUMENTS

JP  03-014477 A  1/1991
JP  2000-077047 A  3/2000
(Continued)

*Primary Examiner* — Carlos Barcena
(74) *Attorney, Agent, or Firm* — Foley & Lardner LLP

(57) ABSTRACT

A system for protecting an electrochemical element from an external shock includes an electrochemical element, a bag-shaped aluminum laminate film configured to receive and entirely cover the electrochemical element, and a protector configured to cover the electrochemical element and the bag-shaped aluminum laminate film. The protector includes a frame having corners and a plurality of recesses disposed at an inner surface of the corners. When the electrochemical element is received in the bag-shaped aluminum laminate film and an interior of the bag-shaped aluminum laminate film is vacuumed, a plurality of wrinkled portions are formed at corners of the bag-shaped aluminum laminate film. The plurality of recesses of the protector are configured to receive the plurality of wrinkled portions of the bag-shaped aluminum laminate film such that portions of the protector other than the plurality of recesses are in intimate contact with the bag-shaped aluminum laminate film.

5 Claims, 3 Drawing Sheets

(56) References Cited

U.S. PATENT DOCUMENTS

| | | | |
|---|---|---|---|
| 4,951,821 A | 8/1990 | Kempkes | |
| 5,543,248 A * | 8/1996 | Dougherty et al. | 429/163 |
| 5,685,429 A | 11/1997 | Myers | |
| 6,616,111 B1 | 9/2003 | White | |
| 6,981,595 B2 | 1/2006 | Brahmbhatt et al. | |
| 2010/0047685 A1* | 2/2010 | Lee et al. | 429/176 |

FOREIGN PATENT DOCUMENTS

| | | | | |
|---|---|---|---|---|
| JP | 2000173563 A | * | 6/2000 | H01M 2/02 |
| JP | 2004-296956 A | | 10/2004 | |
| JP | 2005-302501 A | | 10/2005 | |
| JP | 2006-156185 A | | 6/2006 | |
| WO | WO-2007/045822 A1 | | 4/2007 | |
| WO | WO-2007/072660 A1 | | 6/2007 | |

\* cited by examiner

PROTECTOR FOR ELECTROCHEMICAL ELEMENT

This application is a divisional of U.S. application Ser. No. 12/743,708, filed May 19, 2010, which is the National Stage of Application No. PCT/JP2008/070707 filed on Nov. 13, 2008, which is based upon and claims the benefit of priority from Japanese Application No. 2007-302493, filed on Nov. 22, 2007; the entire contents of all of which are incorporated herein by reference.

TECHNICAL FIELD

The present invention relates to protectors for electrochemical elements. More specifically, the present invention relates to the protectors of a type that protects an electrochemical element unit, such as electric double layer capacitor, Li-ion battery, or the like, covered with an aluminum laminate film, from an external shock.

BACKGROUND ART

The electric double layer capacitor has such a principle that positive and negative surfaces of polarized electrodes physically adsorb anion and cation of electrolyte for storing electric energy.

A bipolar type electric double layer capacitor (which will be called just as capacitor hereinafter) is a stacked device that comprises stacked flat activated carbon electrodes and collector electrodes, and ion passing separators each being sandwiched between adjacent two activated carbon electrodes. Around a unit of the activated carbon electrodes and collector electrodes, there are sealingly put packing members for preventing leakage of a liquid electrolyte therefrom. The packing members serve also as means for achieving isolation between the layers.

In assembling the capacitor, cells by an amount that ensures a needed withstand voltage (cell is the minimum unit of the electrolyte put between mutually opposed activated carbon electrodes) and the packing members are alternately put on one another (each cell having a withstand voltage of about 2.5V), to constitute a stacked body and paired endplates are respectively put on opposed portions of the body. With this, a hermetically sealed construction is provided.

For achieving a perfect sealing between cells, it is necessary to apply a sufficient fastening force to the paired endplates. For this purpose, several pairs of metal screws are passed through openings of the paired endplates, and spacers each having opposed ends with threaded openings are put between the paired endplates, and each pair of metal screws are screwed into the threaded openings of each spacer, so that a sufficient fastening force is applied to the paired endplates.

Furthermore, in order to prevent the entry of water for avoiding mixing of the liquid electrolyte in the capacitor with water, the capacitor is entirely covered with an aluminum laminate film, the interior of the aluminum laminate film thus shaped like a bag and the interior of the capacitor are decompressed to provide the interiors with a vacuum condition, and the aluminum laminate film is welded to the capacitor. With these steps, the capacitor is completely covered and sealed by the aluminum laminate film. This complete covering and sealing by the film is aimed for suppressing quality deterioration and gas generation.

Since the aluminum laminate film is a substance that consists of an aluminum foil laminated with a polypropylene film, polyethylene or the like, the same tends to be easily broken when an external shock is applied thereto, such as when the film is brought into collision with a desk or the like. In such case, moisture in air enters the capacitor and thus the quality of the capacitor is lowered.

As means for protecting the capacitor from such external shock, Japanese Laid-open Patent Application (Tokkai) 2004-296956 discloses a protecting case that entirely covers both the external surface (especially corner portions) of the capacitor and the bag-shaped aluminum laminate film.

SUMMARY OF THE INVENTION

With the interior of bag-shaped aluminum laminate film and the interior of the capacitor being kept decompressed or vacuumed, the aluminate laminate film is welded to the capacitor to completely seal the capacitor. That is, the aluminum laminate film is shaped like a bag and the capacitor is put into the bag-shaped laminate film, and thus, the bag-shaped laminate film is somewhat larger than the capacitor in size.

Accordingly, when, with the interior of the aluminum laminate film being kept decompressed or vacuumed, the film is welded to the capacitor to completely seal the capacitor, corner portions of the bag-shaped laminate film covering the capacitor tend to have wrinkles by an amount corresponding to an excessive size of the bag-shaped laminate film relative to the capacitor. The outside dimension of the capacitor has a limitation. Accordingly, in case wherein it is needed to make the outside dimension of the capacitor as small as possible, the protecting case is fixed to the capacitor by means of a double-faced tape or band.

In such case, it is desirable to intimately contact the capacitor covered with the aluminum laminate film with the protecting case. However, due to provision of the above-mentioned wrinkles on the laminate film, the adherence of the capacitor to a shock absorbing material is lowered. In this case, it tends to occur that the protecting case is easily disconnected and the limited outside dimension is affected.

Although, in the above, the description is directed to an example in which an electric double layer capacitor is used as the electrochemical element, such undesired phenomena tend to occur in a case wherein other secondary battery such as Li-ion battery or the like is covered with the aluminum laminate film.

The present invention is provided by taking the above-mentioned problems into consideration and aims to provide a protector for an electrochemical element, which solves the above-mentioned problems.

In order to solve the above-mentioned problems, the present invention provides a protector for an electrochemical element, that entirely covers an electrochemical element entirely covered with an aluminum laminate film, the protector being characterized by having a recess that receives a wrinkled portion of the aluminum laminate film, the wrinkled portion being formed at a corner portion of the electrochemical element.

The protector for an electrochemical element of the above-mentioned invention may have such a construction that portions of the protector other than the recess are in intimate contact with the aluminum laminate film.

The protector for an electrochemical element of the above-mentioned invention may use, as a shock absorbing member, a thermoplastic elastomer, a vulcanized rubber, a foamed plastic, a foamed rubber or the like, which has a certain resiliency.

The protector for an electrochemical element of the above-mentioned invention may have such an arrangement that the wrinkled portion of the aluminum laminate film is produced when the electrochemical element is put into the aluminum laminate film shaped like a bag and an interior of the bag-shaped aluminum laminate film is vacuumed.

The protector for an electrochemical element of the above-mentioned invention may have such an arrangement that the electrochemical element is a secondary battery, such as, an electric double layer capacitor, Li-ion battery or the like.

The protector for an electrochemical element of the above-mentioned invention may have such an arrangement that the electrochemical element is rectangular parallelepiped in shape.

In the above-mentioned invention, by providing the protector with the recess for receiving therein the wrinkled portion of the aluminum laminate film that is formed at the corner portion of the electrochemical element, the wrinkled portion of the aluminum laminate file is put into the recess at the time when the protector is mounted to the electrochemical element. That is to say, upon mounting, the recess can serve as a relief for the wrinkled portion. Accordingly, the protector can be intimately connected to the electrochemical element. Thus, the protector is prevented from being loosened from the electrochemical element, prevented from having dispersion in dimension and prevented from coming off the electrochemical element.

BEST MODES FOR CARRYING OUT THE INVENTION

In the following, embodiments of the protector for electrochemical element according to the present invention will be described with reference to FIGS. 1 to 8.

The first embodiment that will be described in the following is the most preferred embodiment of the present invention.

First Embodiment

Figure 1:
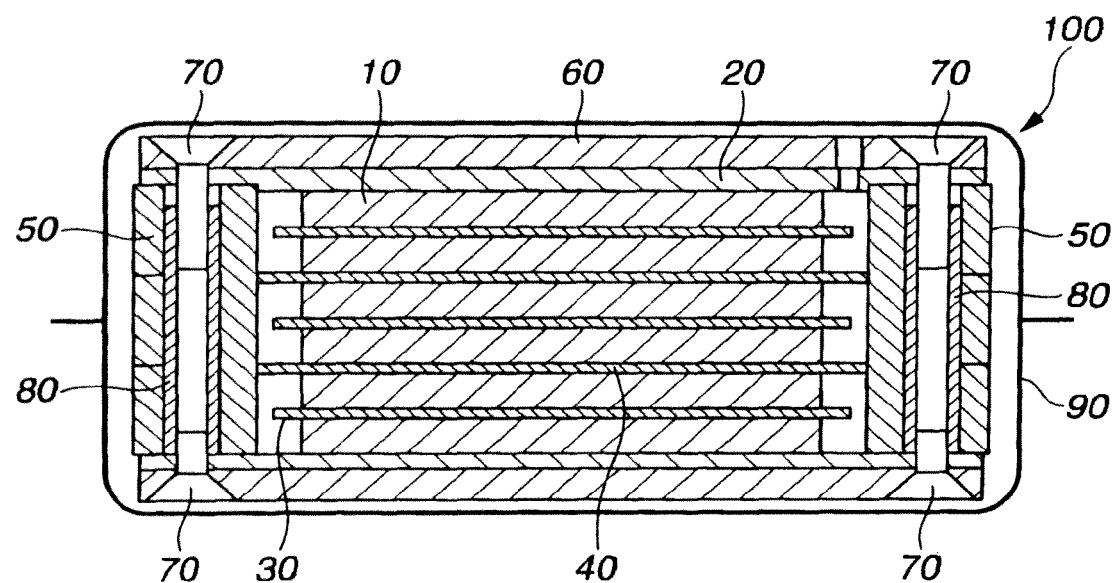
FIG. 1 is a sectional view of an electric double layer capacitor to which an embodiment of the present invention is practically applied.

A capacitor to which the first embodiment is practically applied is shown in FIG. 1.

As is seen from FIG. 1, the capacitor 100 to which the first embodiment is applied is rectangular parallelepiped in shape comprising stacked flat activated carbon electrodes 10 and collector electrodes 20, and ion passing separators 30 each being sandwiched between adjacent two activated carbon electrodes.

That is, collectors 40 each having the activated carbon electrodes 10 attached to opposed surfaces thereof and the separators 30 are alternately stacked to constitute a unit and the collector electrodes 20 are put on opposed sides of the unit in a manner to respectively contact the outermost activated carbon electrodes 10. Around the unit thus provided with the collector electrodes 20, there are sealingly put packing members 50 for preventing leakage of a liquid electrolyte therefrom. The packing members 50 serve also as means for achieving isolation between the layers.

On outer surfaces of the respective collector electrodes 20, there are arranged endplates 60. Several pairs of metal screws 70 are passed through openings of the paired endplates 60, and spacers 80 each having opposed ends with threaded openings are put between the paired endplates 60, and each pair of metal screws 70 are screwed into the threaded openings of each spacer 80, so that a sufficient fastening force is applied to the paired endplates 60 thereby to tighten the construction of the unit of capacitor 100.

The capacitor 100 is entirely covered with an aluminum laminate film 90, the interior of the aluminum laminate film 90 thus shaped like a bag and the interior of the capacitor 100 are decompressed to provide the interiors with a vacuum condition, and the aluminum laminate film is welded to the capacitor to completely seal the capacitor.

Figure 2:
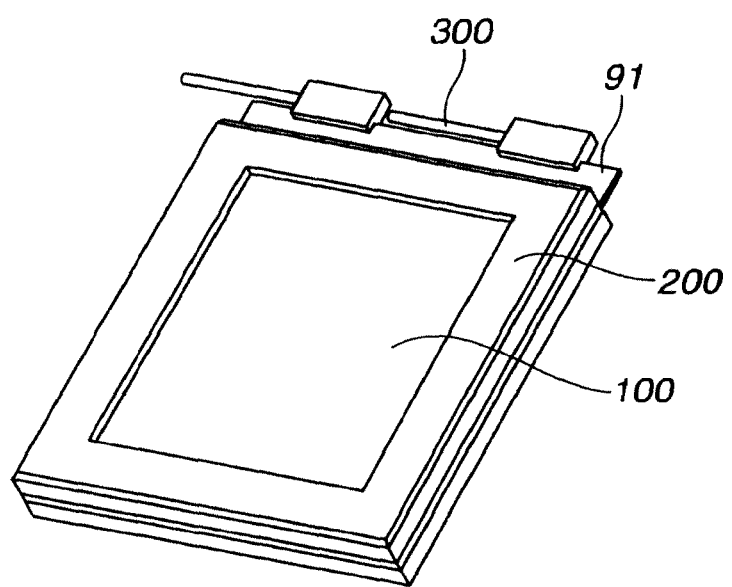
FIG. 2 is a perspective view of the electric double layer capacitor to which a protector of the first embodiment of the invention is practically applied.
Figure 3:
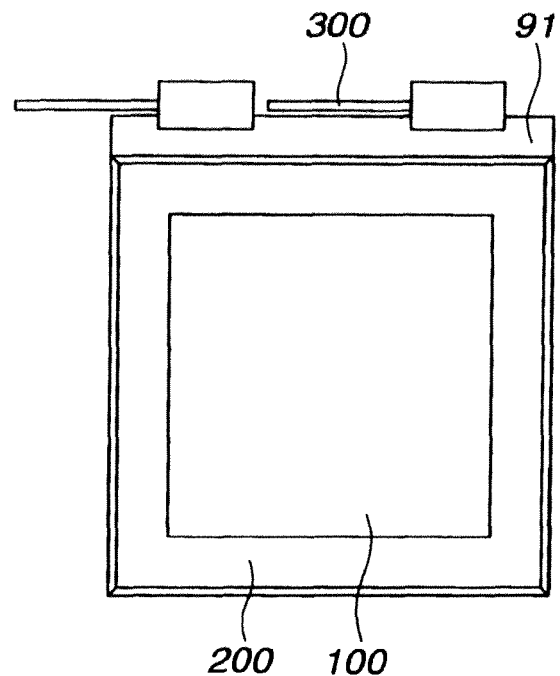
FIG. 3 is a front view of the electric double layer capacitor to which the protector of the first embodiment of the invention is practically applied.
Figure 4:
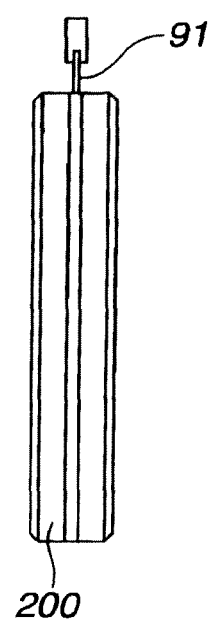
FIG. 4 is a side view of the electric double layer capacitor to which the protector of the first embodiment of the invention is practically applied.

As is seen from FIGS. 2 to 4, in the embodiment, for protecting the capacitor 100 from an external shock, a protector 200 is fixed to the capacitor 100 in a manner to cover both the external surface of the capacitor 100 and the bag-shaped aluminum laminate film 90.

The protector 200 is a frame-like member that has at a central portion a window for protecting corner portions of the capacitor 100. The protector is fixed to the capacitor 100 by for example a double-faced tape (not shown).

The protector 200 may use, as a shock absorbing member, a thermoplastic elastomer, a vulcanized rubber, a foamed plastic, a foamed rubber or the like, which has a certain resiliency. However, the material of the shock absorbing member is not limited to such materials.

When the protector 200 is fixed to the capacitor 100, welded portions 91 of the aluminum laminate film 90 and a terminal portion 300 are exposed to the outside.

Figure 5:
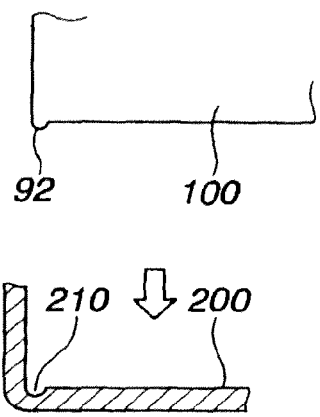
FIG. 5 is a sectional view of a portion where a recess for receiving a wrinkled portion is provided.
Figure 6:
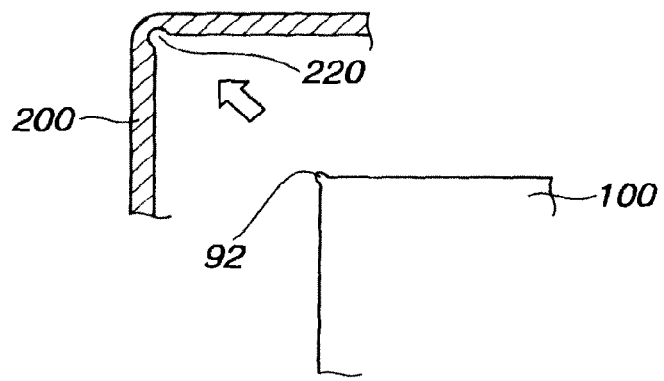
FIG. 6 is a sectional view of a portion where another recess for receiving another wrinkled portion is provided.

As is seen from FIGS. 5 and 6, in the invention, the protector 200 is provided at inside portions of corners thereof with recesses 210 and 220 for accommodating or receiving wrinkled portions 92 of the aluminum laminate film 90. That is, the recesses 210 and 220 serve as a relief for the wrinkled portions 92.

As is mentioned hereinabove, the aluminum laminate film 90 is shaped like a bag, and the capacitor 100 is put into the bag-shaped laminate film 90, and thus, the bag-shaped laminate film 90 is somewhat larger than the capacitor 100 in size. Accordingly, when, with the interior of the bag-shaped aluminum laminate film 90 being kept decompressed or vacuumed, the film is welded to the capacitor to completely seal the capacitor, corners of the bag-shaped laminate film tend to have wrinkled portions 92 by an amount corresponding to an excessive size of the bag-shaped laminate film relative to the capacitor.

Since the capacitor 100 is rectangular parallelepiped in shape, it is considered that the wrinkled portions 92 produced due to remnant in dimension are provided along sides defined by side surface, upper surface and bottom surface located at front, rear, left and right positions.

Accordingly, the recesses 210 and 220 for receiving the wrinkled portions 92 are provided at inside portions of the corners of the protector 200 forming grooves that extend along the sides of the capacitor 100.

It is to be noted that the wrinkled portion 92 shown in FIG. 5 is a wrinkled portion that is provided at a lower portion of the capacitor 100 in the drawing that projects downward, and the wrinkled portion 92 shown in FIG. 6 is another wrinkled portion that is provided between the upper surface and left side surface of the capacitor 100 in the drawing that projects obliquely upward.

Accordingly, an inside of a corner of the protector 200 shown in FIG. 5 is formed with a recess 210 (viz., a part depressed downward in the drawing) for receiving the downwardly projected wrinkled portion 92, and an inside of a corner of the protector 200 shown in FIG. 6 is formed with a recess 220 (viz., a part depressed obliquely upward in the drawing) for receiving the obliquely upwardly projected wrinkled portion 92.

Accordingly, as is indicated by an arrow in FIG. 5, when the capacitor 100 is moved downward toward the protector 200, the wrinkled portion 92 of the aluminum laminate film 90 enters into the recess 210 formed in the inside of the corner of the protector 200 and at the same time horizontal and vertical flat portions of the capacitor 100 other than the wrinkled portion are brought into intimate contact with the inside surface of the protector 200.

Like the above, as is seen from FIG. 6, when the capacitor 100 is moved upward toward the protector 200, the wrinkled portion 92 of the aluminum laminate film 90 enters into the recess 220 formed in the inside of the corner of the protector 200 and at the same time horizontal and vertical flat portions of the capacitor 100 other than the wrinkled portion are brought into intimate contact with the inside surface of the protector 200.

It is to be noted that the arrows shown in FIGS. 5 and 6 are not intended to show actual moving direction and step for mounting the protector 200 to the capacitor 100 but intended to make an explanation for convenience' sake.

Figure 7:
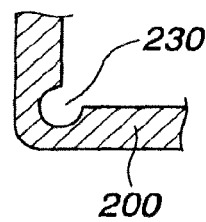
FIG. 7 is a sectional view of a portion where still another recess for receiving the wrinkled portion is provided.
Figure 8:
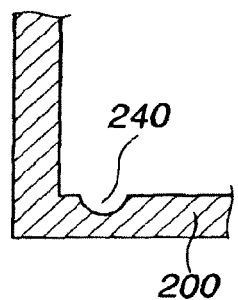
FIG. 8 is a sectional view of a portion where a further recess for receiving the wrinkled portion is provided.

The recesses for receiving the wrinkled portions 92 are not limited to those shown in FIGS. 5 and 6. That is, as is shown in FIG. 7, a recess 230 having a largely curved inner surface may be used and as is shown in FIG. 8, a recess 240 placed away a little from the corner may be used. That is, the shape and position of the recess have no limitation so long as the recess can receive the wrinkled portion 92.

The present invention is widely applicable to the industrial field as a protector that protects an electrochemical element unit, such as a unit that includes an electrochemical element covered with an aluminum laminated film or the like, from an external shock.

The invention claimed is:

1. A system for protecting an electrochemical element from an external shock comprising:
    an electrochemical element;
    a bag-shaped aluminum laminate film configured to receive and entirely cover the electrochemical element; and
    a protector configured to entirely cover the electrochemical element and the bag-shaped aluminum laminate film, the protector comprising
        a frame having corners; and
        a plurality of recesses disposed at an inner surface of the corners,
    wherein when the electrochemical element is received in the bag-shaped aluminum laminate film and an interior of the bag-shaped aluminum laminate film is vacuumed, a plurality of wrinkled portions are formed at corners of the bag-shaped aluminum laminate film, and
    wherein the plurality of recesses of the protector are configured to receive the plurality of wrinkled portions of the bag-shaped aluminum laminate film such that portions of the protector other than the plurality of recesses are in intimate contact with the bag-shaped aluminum laminate film.

2. The system of claim 1, wherein the plurality of wrinkled portions are formed at corners of the bag-shaped aluminum laminate film where a perimeter of the bag-shaped aluminum laminate film is larger than a perimeter of the electrochemical element.

3. The system of claim 1, wherein the protector further comprises a shock absorbing member comprised of a thermoplastic elastomer, a vulcanized rubber, a foamed plastic or a foamed rubber, which has a certain resiliency.

4. The system of claim 1, wherein the electrochemical element comprises a secondary battery, an electric double layer capacitor or a Li-ion battery.

5. The system of claim 1, wherein the electrochemical element is rectangular in shape.

* * * * *